(12) United States Patent
Arnold et al.

(10) Patent No.: US 9,193,255 B2
(45) Date of Patent: Nov. 24, 2015

(54) HYBRID MODULE FOR A DRIVE TRAIN OF A VEHICLE

(75) Inventors: Johannes Arnold, Achern (DE); Ivo Agner, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 315 days.

(21) Appl. No.: 13/177,725

(22) Filed: Jul. 7, 2011

(65) Prior Publication Data

US 2011/0259698 A1   Oct. 27, 2011

Related U.S. Application Data

(63) Continuation of application No. PCT/DE2009/001808, filed on Dec. 22, 2009.

(30) Foreign Application Priority Data

Jan. 19, 2009 (DE) .......................... 10 2009 005 074
Mar. 9, 2009 (DE) .......................... 10 2009 011 767

(51) Int. Cl.

| B60K 6/38 | (2007.10) |
|---|---|
| B60K 6/405 | (2007.10) |
| B60K 6/48 | (2007.10) |
| F16D 21/06 | (2006.01) |
| F16D 25/10 | (2006.01) |
| B60K 6/36 | (2007.10) |
| B60K 6/547 | (2007.10) |
| F16D 25/0638 | (2006.01) |
| F16H 3/00 | (2006.01) |

(52) U.S. Cl.
CPC ... *B60K 6/48* (2013.01); *B60K 6/36* (2013.01); *B60K 6/38* (2013.01); *B60K 6/405* (2013.01); *B60K 6/547* (2013.01); *F16D 21/06* (2013.01); *F16D 25/0638* (2013.01); *F16D 25/10* (2013.01); *B60Y 2400/428* (2013.01); *F16D 2021/0661* (2013.01); *F16H 3/006* (2013.01); *Y02T 10/6221* (2013.01)

(58) Field of Classification Search
CPC .......................... B60K 6/38; F16D 2021/0661
USPC ............ 903/912; 192/48.606, 48.611, 48.619
See application file for complete search history.

(56) References Cited

U.S. PATENT DOCUMENTS

| 5,856,709 | A | * | 1/1999 | Ibaraki et al. | 290/45 |
| 5,875,691 | A | * | 3/1999 | Hata et al. | 74/661 |
| 6,354,974 | B1 | * | 3/2002 | Kozarekar | 475/5 |
| 6,533,692 | B1 | * | 3/2003 | Bowen | 475/5 |
| 7,293,637 | B2 | * | 11/2007 | Janson et al. | 192/48.611 |
| 8,757,305 | B2 | * | 6/2014 | Roske et al. | 180/65.22 |

(Continued)

FOREIGN PATENT DOCUMENTS

| DE | 102007026133 | 12/2008 |
| EP | 0773127 | 5/1997 |

*Primary Examiner* — Terry Chau
(74) *Attorney, Agent, or Firm* — Volpe and Koenig, P.C.

(57) ABSTRACT

A hybrid module for a drive train of a vehicle, including a first disconnect clutch (2), an electric motor (4), and a second disconnect clutch (1). The first disconnect clutch (2) is disposed in the torque flow path between a combustion engine (3) in the drive train and the electric motor (4), while the second disconnect clutch (1) is disposed in the torque flow path between the electric motor (4) and a transmission (6, 7) in the drive train. The first disconnect clutch (2) and the second disconnect clutch (1) are disposed in a joint wet chamber.

10 Claims, 8 Drawing Sheets

(56) References Cited

U.S. PATENT DOCUMENTS

| | | |
|---|---|---|
| 2007/0022835 A1 | 2/2007 | Kilian et al. |
| 2007/0089962 A1* | 4/2007 | Enstrom .................... 192/87.11 |
| 2007/0175726 A1* | 8/2007 | Combes et al. ............ 192/87.11 |
| 2009/0054203 A1* | 2/2009 | Heeke ............................ 477/15 |
| 2009/0283344 A1* | 11/2009 | Arnold et al. .............. 180/65.22 |
| 2010/0179024 A1* | 7/2010 | Holmes ............................. 477/5 |
| 2010/0314185 A1* | 12/2010 | Schoenek .................... 180/65.7 |
| 2010/0326785 A1* | 12/2010 | Schrage .................... 192/70.12 |
| 2011/0301796 A1* | 12/2011 | Ohashi et al. ................... 701/22 |
| 2012/0014815 A1* | 1/2012 | Kraxner ..................... 417/199.1 |

* cited by examiner

HYBRID MODULE FOR A DRIVE TRAIN OF A VEHICLE

CROSS-REFERENCE TO RELATED APPLICATIONS

This application is a continuation of International Application No. PCT/DE2009/001808, filed Dec. 22, 2009, which claims the benefit of German Patent Application No. 10 2009 005 074.4, filed Jan. 19, 2009 and German Patent Application No. 10 2009 011 767.9, filed Mar. 9, 2009, all of which are incorporated herein by reference as if fully set forth.

BACKGROUND

The present invention relates to a hybrid module for a drive train of a vehicle, wherein the hybrid module is arranged between a combustion engine and a transmission.

A drive train of a hybrid vehicle comprises a combination of a combustion engine and an electric motor and makes possible—for example, in densely populated areas—a purely electric operation with simultaneously adequate range and availability even for long-distance trips. In addition, there is the possibility of simultaneous driving by the combustion engine and the electric motor. Here, the electric motor of hybrid vehicles usually replaces the previously typical starters for combustion engines and the alternators, in order to reduce the added weight of the hybrid vehicle with respect to vehicles with conventional drive trains.

In addition, a first disconnect clutch could be arranged between the combustion engine and electric motor, in order to disconnect the combustion engine from the electric motor and the rest of the drive train of the hybrid vehicle. For purely electric travel, the first disconnect clutch is then opened and the combustion engine is turned off, so that the driving torque of the hybrid vehicle is applied just by the electric motor.

Furthermore, a second disconnect clutch could be arranged between the electric motor and transmission, so that also the electric motor could be disconnected from the rest of the drive train of the hybrid vehicle. If the first disconnect clutch and the second disconnect clutch are opened, then the combustion engine could be started by the electric motor, so that a separate starter for the combustion engine could be eliminated.

Just for the use of the first and second disconnect clutches in connection with an electric motor with necessarily large dimensions, the corresponding hybrid module has a comparatively large construction in contrast to conventional drive trains with a disconnect clutch and starter motor or with a double clutch and starter motor.

SUMMARY

Therefore, an objective of the present invention is to create a hybrid module for a drive train of a vehicle with reduced requirements for installation space.

This objective is met by a hybrid module for a drive train of a vehicle according to the invention.

Preferred embodiments of the hybrid module according to the invention are described below and in the claims.

BRIEF DESCRIPTION OF THE DRAWINGS

The present invention is explained in detail below with reference to preferred embodiments in connection with the associated figures. Shown in these are.

DETAILED DESCRIPTION OF THE PREFERRED EMBODIMENTS

Figure 1:
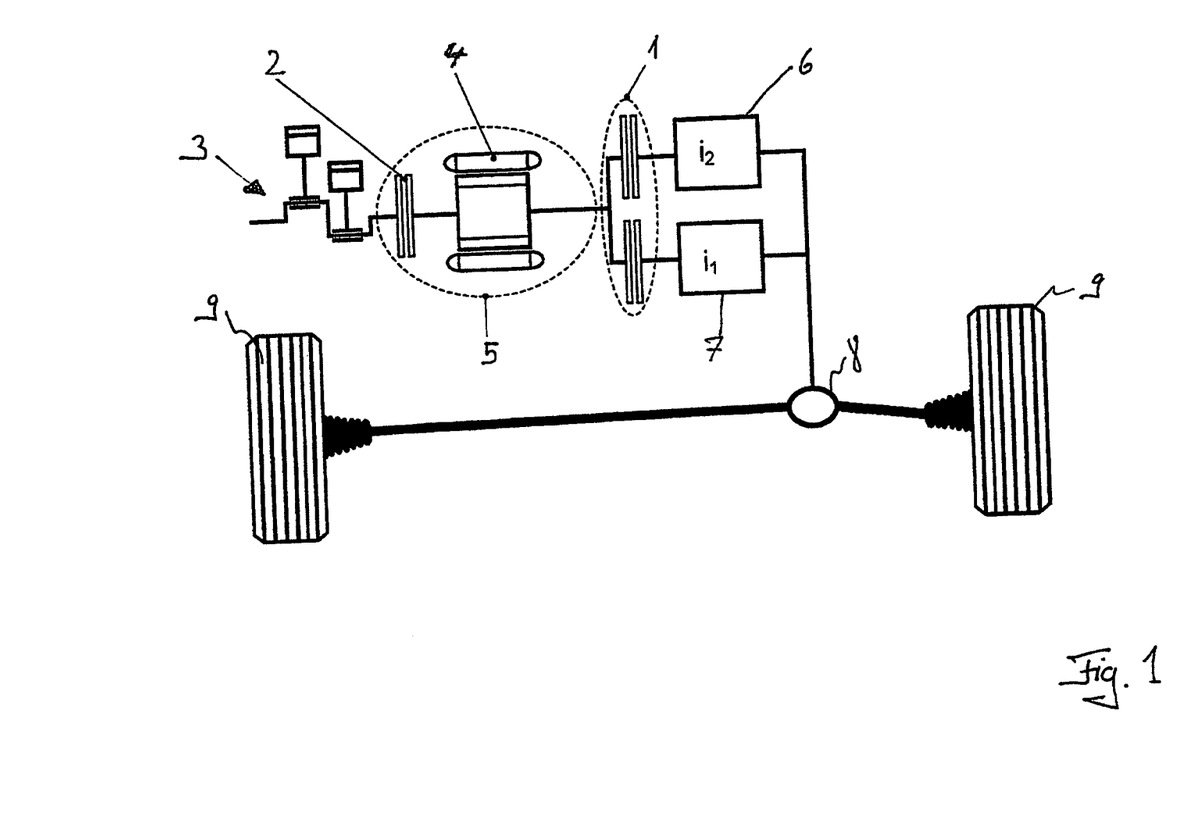
FIG. 1 is a schematic configuration of a hybrid module (with electric motor and disconnect clutch) in connection with a double wet clutch, which are arranged between the combustion engine and a double clutch transmission of a drive train of a vehicle.

The arrangement shown in FIG. 1 includes a doublet wet clutch 1, for example, with co-rotating or non-co-rotating wet chamber, as well as a disconnect clutch 2 between combustion engine 3 and the double clutch 1. An electric motor 4 is arranged between the disconnect clutch 2 and the double clutch 1. The disconnect clutch 2 and the electric motor 4 together form a hybrid module 5. As an alternative to a wet double clutch, a dry double clutch could also be provided.

Each of the sub-clutches of the double wet clutch 1 is connected to a sub-transmission 6, 7, wherein the sub-transmissions 6, 7 (with the transmission ratios i1 and i2, respectively) have a joint output that transfers a torque generated by the combustion engine and/or the electric motor via the differential 8 to the driving wheels 9. In the present case, as an example, two wheels are shown, wherein this case is to be understood only symbolically and obviously a different number of driving wheels could also be provided.

If both sub-clutches of the double clutch 1 are opened, then the combustion engine 3 could be started by the electric motor 4 when the disconnect clutch 2 is closed.

In the purely electric-motor operation, the disconnect clutch 2 is opened and the combustion engine 3 is disconnected from the flow of forces in this way.

During operation with combustion engine 3, the disconnect clutch 2 is closed. The electric motor 4 could then be used, for example, for boosting and for capturing braking energy.

In the configuration of a hybrid drive train shown in FIG. 1, the electric motor 4 also turns in the driving operation, independent of whether it is incorporated into the power flow or not.

Figure 2:
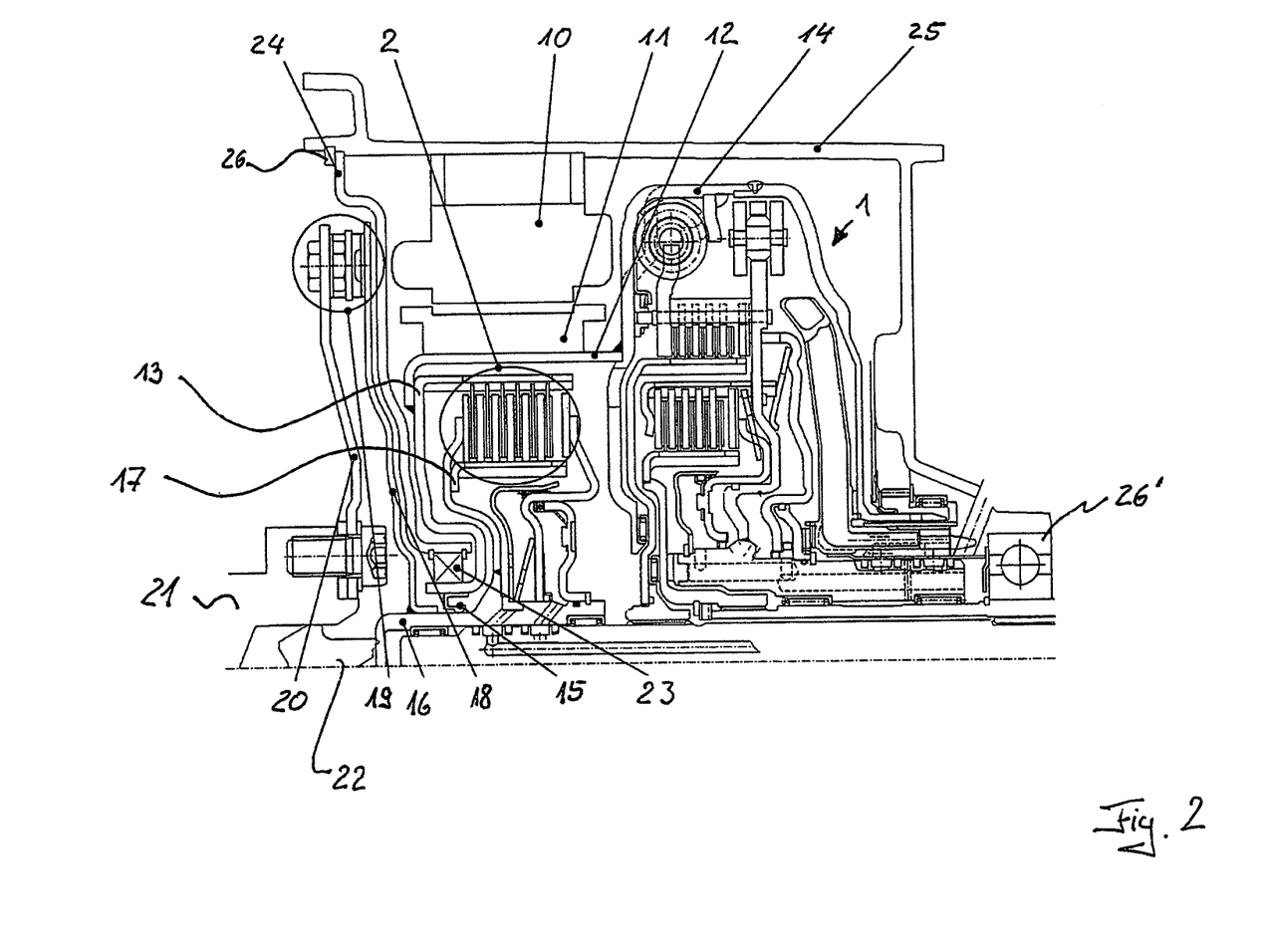
FIG. 2 is a half section view of a first embodiment of a hybrid module according to the invention in connection with double wet clutch with rotating wet chamber for arrangement in a drive train of a hybrid vehicle.

In FIG. 2, a first embodiment of a hybrid module with a disconnect clutch 2 and an electric motor 4 including a stator 10 and a rotor 11 are shown in connection with a double wet clutch 1 that is connected downstream of the hybrid module and with an outer sub-clutch K1 in the radial direction and an inner sub-clutch K2 in the radial direction, wherein the disconnect clutch 2 and the double clutch 1 are arranged in a joint, closed wet chamber.

The joint wet chamber of double clutch 1 and disconnect clutch 2 comprises a rotor carrier 12 of the electric motor 4 that is connected in an oil-tight and torque-fixed manner to an outer plate carrier 13 of the disconnect clutch 2 and to a clutch housing 14 of the double clutch 1. In other words, the wet chamber of the double clutch 1 is expanded by the rotor carrier 12 of the electric motor 4 and by the outer plate carrier 13 of the disconnect clutch 2. The oil-tight and torque-fixed connection between clutch housing 14 and rotor carrier 12 or between the rotor carrier 12 and outer plate carrier 13 of the disconnect clutch 2 could be constructed as a welded or screwed connection with an additional, statically active sealing element (sealing ring).

The rotor carrier 12 of the electric motor 4 is constructed as a ring-shaped pot that seals, together with the outer plate carrier 13 and housing 14, the wet chamber to the combustion engine 3.

The rotor 13 is pressed onto the rotor carrier 12.

The stator 10 of the electric motor 4 is installed in the clutch casing, i.e., is connected to the transmission housing 25.

A radial shaft sealing ring 15 that is arranged between a clutch hub 16 of the disconnect clutch 2 connected to an input-side inner plate carrier 17 of the disconnect clutch 2 and the output-side outer plate carrier 13 of the disconnect clutch 2 takes over the sealing of the joint wet chamber of the double clutch and disconnect clutch with respect to the surrounding dry chamber. Here, the clutch hub 16 is connected as a closed pot that seals the wet chamber to the combustion engine.

The clutch hub 16 is connected by a flexplate or a drive plate 18 that is connected by a screwed connection or a universal joint suspension 19 to another flexplate or drive plate 20 that is connected, in turn, to a crankshaft 21 of the combustion engine 3.

A preliminary centering of the clutch hub 16 for mounting and thus of the hybrid module 5 and the double clutch 1 for mounting could be carried out by a pilot journal 22 that is inserted into a recess of the crankshaft 21 (comparable to a converter configuration), wherein a motor-side mounting of the hybrid module and the double clutch is made possible, even in the case that the hybrid module and the double clutch are initially connected to the transmission before a connection to the motor is carried out.

The output-side outer plate carrier 13 of the disconnect clutch 2, the rotor carrier 12, and the double clutch 1 are supported so that they can rotate on a cover 24 by a motor-side bearing 23, wherein the cover 24 is supported and mounted on a transmission housing 25, for example, by a locking ring 26 and optionally another sealing element.

The outer plate carrier 13 of the disconnect clutch 2 and thus also the rotor carrier 12 and rotor 11 of the electric motor 4 are supported on the rotor side fixed relative to the cover in the transmission casing by means of the motor-side bearing 23. On the transmission side, the unit above the clutch housing 14 is likewise supported in the clutch casing by the bearing 26'. In the present case, the transmission-side bearing 23 is constructed as a pure radial bearing (movable bearing) and the transmission-side bearing 26' as a radial and axial bearing (fixed bearing). The transmission-side bearing 26' and the motor-side bearing 23 are each arranged in opposing end regions of the hybrid module and the double clutch, so that just for the rotor carrier, a wide support and thus precise running of the rotor in the stator is produced. The small tolerances to be maintained in the gap between the rotor and stator can be reliably maintained accordingly.

The support described above also makes possible a support of the radial and axial forces that appear and through the cover-fixed linking, fixes the axial position of the unit of the disconnect clutch and double clutch within the clutch casing.

Figure 3:
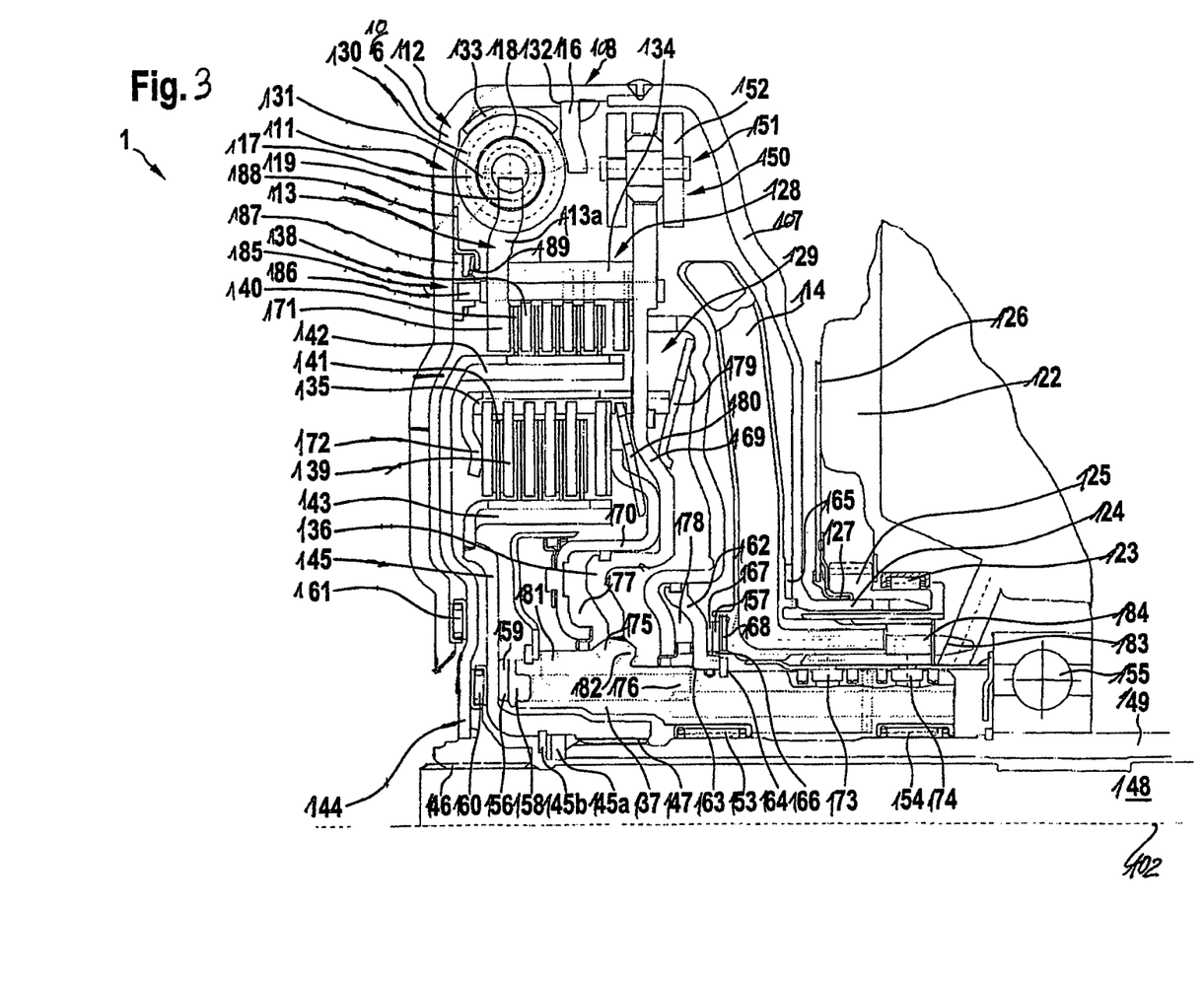
FIG. 3 is a half section view of the double wet clutch with rotating wet chamber according to the embodiment from FIG. 2.

Details on the double clutch 1 are specified in FIG. 3, wherein the embodiment of the double clutch from FIG. 3 is to be understood only as an example for different types of double clutches with a co-rotating wet chamber.

FIG. 3 shows the double clutch assembly 1 in assembled state as a partial section view above the axis of rotation 102. The clutch assembly 1 is arranged between the drive unit 3 and the transmission 6, 7.

The housing 108 is supported by the roller bearing 123 so that it can rotate on the transmission housing 122, wherein the crown gear 125 for the transmission oil pump that can also circulate the pressurized medium of the clutch assembly 1 is arranged between the ring-shaped axial projection 124 of the housing part 107 and the roller bearing 123 by a sleeve-shaped projection and is driven by the projection 124. The pump drive formed from the crown gear 125 and the roller bearing 123 that also forms a support for the housing 108 of the housing wall of the transmission housing 122 by the crown gear 125 is advantageously pre-mounted on the transmission housing 122, wherein, for the connection of clutch assembly 1 and transmission, the suction pipe 114 is centered in the feed mechanism and the guide pins 183 pass through this mechanism and can be displaced in the axial direction in the transmission housing 122 and can accommodate the suction pipe 114 in a rotationally fixed manner. On the axial projection 124, a centered sealing disk 126 made from, for example, sheet metal or plastic, is provided with a seal 127, such as radial shaft sealing ring for the projection 124 for sealing the housing 108 relative to the transmission housing 122.

Within the housing 108 filled at least partially with pressurized medium, the torsional vibration damper 112 and the two wet clutches 128, 129 arranged one above the other in the radial direction are accommodated. The input part of the torsional vibration damper 112 is here formed by the housing that applies a force in the peripheral direction on the energy storage devices 111 that are active in the peripheral direction and are formed, in the illustrated embodiment, from advantageously two bow-spring groups arranged across the periphery each with two bow springs 130, 131 nested one inside the other in the radial direction by the catches 117, 118 engaging in the radial direction in the ends of the bow springs 130, 131. The catches 117 are here formed from deformations of the housing part 106 arranged across the periphery and the catches 118 are formed by exposed regions of the annular flange part 116. The annular flange part 116 is placed on the radial projection 132 of the housing part 106 after placement of the bow springs 130, 131 and fixed in the axial direction, for example, welded, and are used for the captive accommodation of the bow springs 130, 131 before assembly and the axial guidance of the bow springs 130, 131 during operation. Between the bow springs 130 and the outer region of the housing part 106 in the radial direction, an anti-wear lining 133 is provided, which is arranged in two parts in the peripheral direction between the catches 117 and can be supported floating relative to the housing 108.

The torsional vibration damper 112 is active in the torque flow before the wet clutches 128, 129, so that the output part of the torsional vibration damper 112 is simultaneously the joint input part 113 of the wet clutches 128, 129. To this end, the input part 113 provides a flange part 113*a* with the output-side catches 119 of the torsional vibration damper 112, which are constructed as arms extended in the radial direction of the flange part 113A and apply a force on the end faces of the bow springs 130, 131 in the non-tensioned state of the bow springs 130, 131 on the same periphery of the catches 117, 118 and thus cause a tensioning of the bow springs 130, 131 for a relative rotation of the housing 108 relative to the input part 113 of the wet clutches 128, 129, so that the torque spikes causing such relative rotations are damped, in that the bow springs active as energy storage devices 111 temporarily buffer the energy of these torque spikes.

Through the use of the torsional vibration damper 112, the torque of the drive unit is registered in the input part 113. The input part 113 distributes the torque onto the input-side plate carriers 134, 135 of the wet clutches 128, 129 that are centered and supported by a common carrier disk 136 that is connected rigidly, such as welded, to the clutch hub 137. A centrifugal force pendulum 151 with flyweights 152 that can be displaced to a limited extent relative to the carrier disk 136 in the peripheral direction and radial direction is arranged on the carrier disk 136 of the torsional vibration absorber 150, for example—as shown—outside in the radial direction and advantageously spaced apart in the axial direction and at the same height in the radial direction. In the input-side plate carriers 134, 135, plates 138, 139 are suspended that alternate in the axial direction with output-side friction plates 140, 141 and form a friction fit when an axial force is applied. The output-side friction plates 140, 141 are suspended in plate carriers 142, 143 that are each connected, such as, welded, to a hub 144, 145 with teeth 146, 147 with the transmission input shaft 148 or with the transmission input shaft 149 arranged around this shaft and constructed as a hollow shaft and are therefore supported and centered on the two transmission input shafts 148, 149.

After installation, the clutch hub 137 is supported floating in the axial direction by the roller bearings 153, 154 on the transmission input shaft 149. The transmission input shaft 149 is supported in the axial direction by the roller bearing 155 and fixed in the radial direction in the transmission housing 122.

The floating support of the clutch hub 137 is limited by the two thrust washers 156, 157. The thrust washer 156 is formed in one part from plastic and contains the carrier part 158 introduced into the end side of the clutch hub 137 and the lubricating oil grooves 159. The hub 145 is applied in the axial direction and so that it can rotate relative to the hub 144 by the roller bearing 160. The hub 144 is supported by the roller bearing 161 fixed in the axial direction so that it can rotate on the housing part 106, so that the clutch hub 137 is supported in the axial direction by the shim washer 167, in that, for example, a defined play is set by these parts. The axial biasing necessary for the bearings 160, 161 is set by the energy storage device 145 active in the axial direction, for example, a corrugated spring that is itself supported on the transmission input shaft 149 by the locking washer 145B. In the opposite direction, the clutch hub 137 is supported by the sealing plate 162 that is arranged fixed on the projection 163 in the axial direction by the locking ring 164, on the suction pipe 114 that is, in turn, supported in the axial direction by the thrust washer 165 that could be constructed as a roller bearing on the housing part 107. Between the sealing plate 162 and the suction pipe 114, the thrust washer 157 is arranged that is active in the axial direction and makes possible a displacement that is limited in the axial direction of the clutch hub 137 against its effect in the direction of the housing part 107, so that the clutch hub 137 can be displaced to a limited extent in both axial directions, can be displaced relative to the housing 108, and is therefore supported in a floating manner. The thrust washer 157 is formed from a carrier disk 166 meshed with the sealing plate 162 and a shim washer 167 that is accommodated rigidly on this carrier disk and comes in contact with a thrust washer 168 meshed with the suction pipe 114.

The two wet clutches 128, 129 are charged by pistons 169, 170 that can be displaced in the axial direction by a pressurized medium and press the plates 138 and 139, respectively, in the axial direction with the friction plates 140 and 141, respectively, against an end plate 171, 172 and therefore form a friction fit. To this end, the pressurized medium is led via rotating bushings 173, 174 into supply lines 175, 176 and dosed into the pressure chambers 177, 178, wherein the pistons 169, 170 are displaced against the effect of the energy storage devices 179, 180 active in the axial direction and the wet clutches 128, 129 are each therefore closed according to the applied pressure of the pressurized medium. If the pressure in the pressure chambers 177, 178 dissipates, the wet clutches are automatically opened again by the release of tension by the energy storage devices 179, 180. The supply lines 181, 182 are used for cooling the wet clutches 128, 129, in particular, the friction linings of the friction plates 140, 141 that are exposed to particular heat stress especially under slipping conditions of the wet clutches 128, 129. The pressurized medium dosed in this way cools the friction plates 140, 141 and flows outward in the radial direction, from where it is siphoned by the suction pipe 114 connected rigidly to the transmission housing 122 by the guide pins 183 and is fed to the transmission pan via the discharge line 184.

A friction mechanism 185 can be provided between the torsional vibration damper 112 and the input part 113 of the wet clutches 128, 129. To this end, a friction ring 187 that is centered by the retaining ring 188 mounted on the housing part 106 and is biased relative to this by the energy storage device 189 that is active in the axial direction and can be, for example, as shown, a plate spring, can be charged by pins 186 of the plate carrier 134, wherein these pins are raised in the axial direction and are distributed across the periphery. Additionally or alternatively, the friction mechanism 185 could be used as a centering mechanism of the two wet clutches 128, 129 in the housing 108 before the final assembly as long as this is not yet centered on the transmission input shaft 149.

Figure 4:
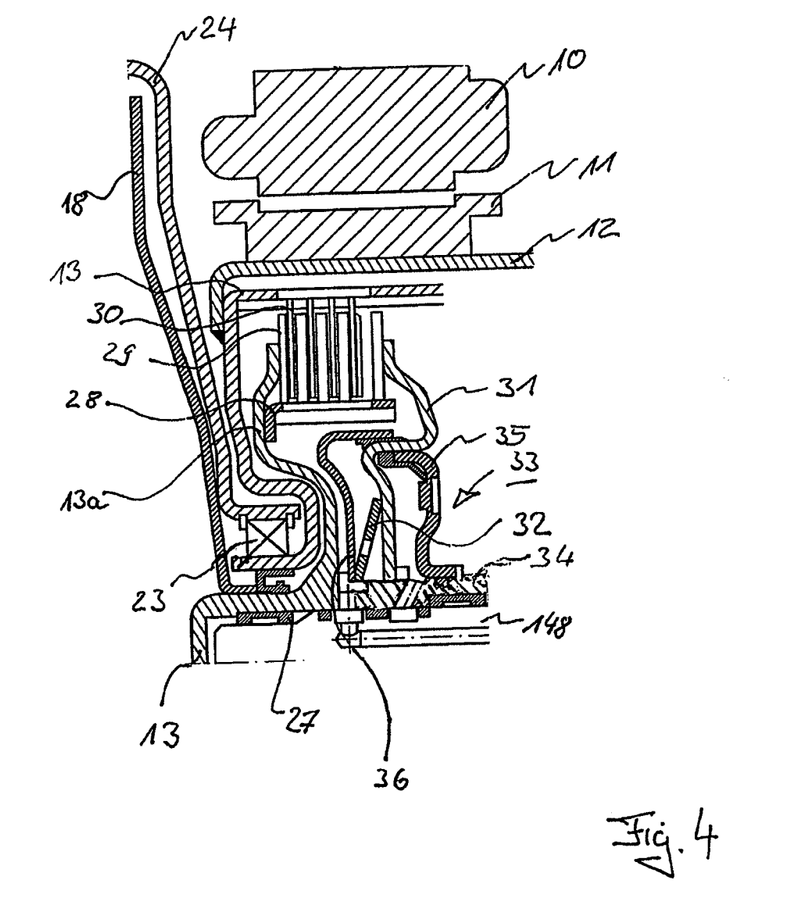
FIG. 4 is a half section view of the disconnect clutch according to the embodiment from FIG. 2.

In FIG. 4, one possible construction of the disconnect clutch from FIG. 2 is shown. The torque coming from the crankshaft 21 is transmitted via the drive plate or the flexplate 18 to the clutch hub 16, wherein the clutch hub 16 is supported in the radial direction by a bearing 27 on a transmission input shaft 148 constructed as a solid shaft. The clutch hub 13 has a region 13*a* that is extended in the radial direction and on which an input-side inner plate carrier 28 is mounted. On this input-side plate carrier 28, input plates are suspended locked in rotation but moveable in the axial direction. Alternating to these input plates 29, output plates 30 are provided that are suspended in the output-side outer plate carrier 31 locked in rotation but moveable in the axial direction. The output-side outer plate carrier 13 is connected rigidly, as already explained, to the rotor carrier 12, wherein the rotor 11 is mounted on the rotor carrier 12 and the stator 10 is arranged adjacent to the rotor 11 across a gap, wherein this stator is mounted on the transmission housing 25. The output-side outer plate carrier 13 is supported in the radial direction on the cover 24 by the bearing 23.

The input-side and output-side plates 29, 30 form a plate package whose friction faces can be brought into frictional contact by the piston 31. The piston is pre-loaded by the plate spring 32 such that the plate package is opened when no activation force is exerted. The activation force is produced by the cylinder/piston unit 33 with the pot-shaped plates 35 and 36 that are supported on an extended hub region 34 of the input hub 13, wherein pressure chambers that can be charged with pressurized medium via drilled holes in the extended hub region 34 formed between the pot-shaped plates 35 and 36 and the piston 31.

As illustrated, the embodiment described above according to FIG. 2 shows a hybrid disconnect clutch and a double clutch with a joint rotating wet chamber, wherein the torque transmission between the hybrid disconnect clutch, electric motor, and double clutch is carried out via the output-side outer plate carrier of the hybrid disconnect clutch, the rotor carrier of the electric motor, and the housing of the double clutch.

Figure 5:
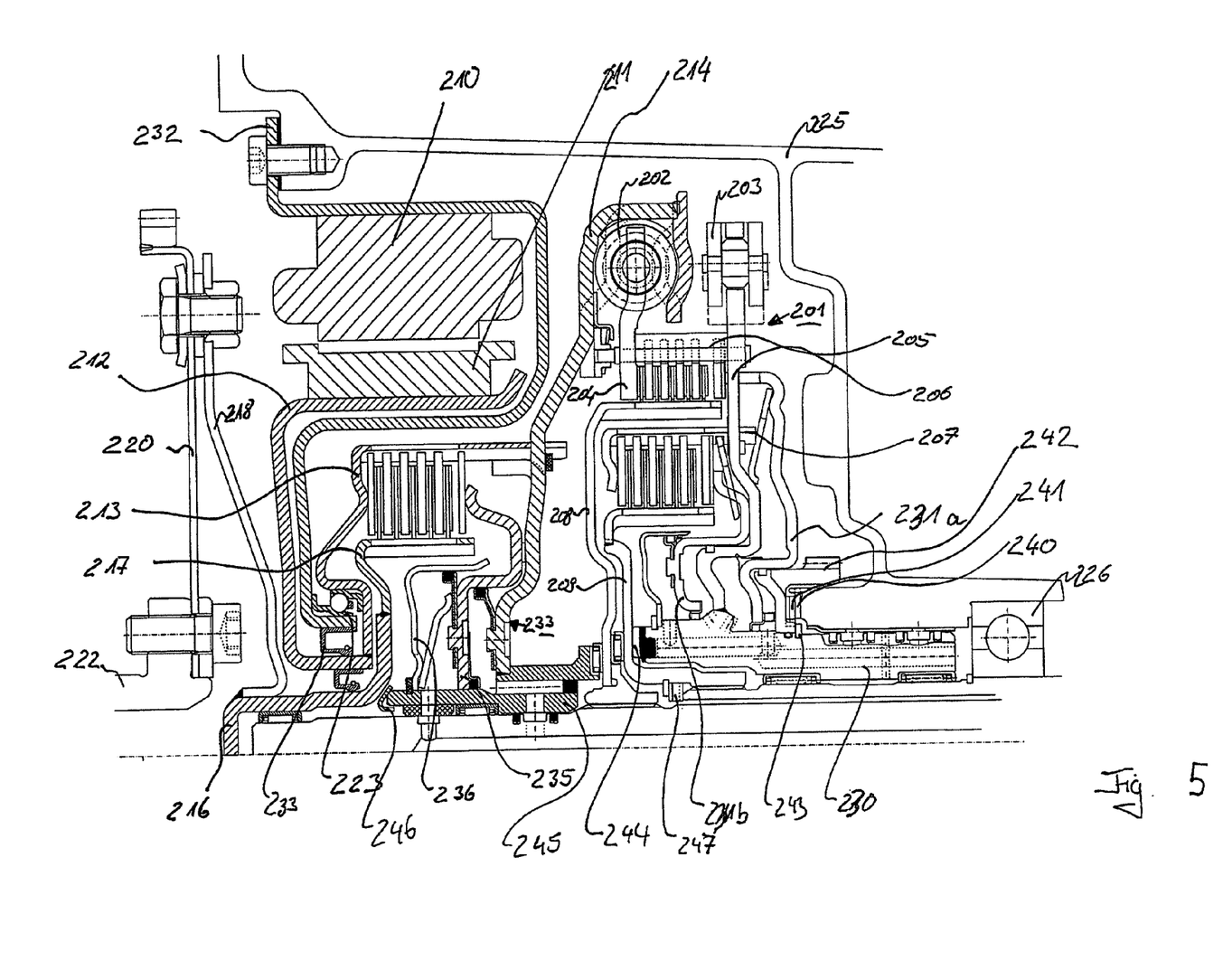
FIG. 5 is a view of another embodiment of a hybrid module with electric motor and disconnect clutch in connection with another embodiment of a double wet clutch with non-co-rotating wet chamber for use in a drive chamber of a hybrid vehicle, wherein, with the double wet clutch, the hybrid module (electric motor and disconnect clutch) forms a joint mounting assembly.

FIG. 5 shows another embodiment of a hybrid configuration with hybrid disconnect clutch 2, electric motor 4, and a downstream double wet clutch 201, but, in the present case, with a non-rotating wet chamber. Comparable to the prior embodiment, the system for vibration isolation consists, in the present case, from a bow spring damper 202 and a centrifugal force pendulum 203 that are integrated in the clutch 201 and are arranged in a joint wet chamber.

In the present case, torque from the crankshaft 222 is transmitted via the drive plate/flexplate 220 to the drive plate/flexplate 218, wherein the drive plate/flexplate 218 is connected rigidly to the input-side clutch hub 216. The input-side clutch hub 216 is connected to an input-side inner plate carrier 217 of the hybrid disconnect clutch 2 on which input-side friction plates are suspended locked in rotation, but movable in the axial direction.

The input friction plates are arranged alternately with output friction plates that are suspended in the output-side outer plate carrier 213 locked in rotation but movable in the axial direction. The outer plate carrier 213 is connected rigidly to the rotor carrier 212 of the electric motor 4, wherein the rotor 211 is mounted on the rotor carrier 212. The output-side outer plate carrier 213 of the hybrid disconnect clutch is supported by the motor-side bearing 223 on the cover 232, wherein the cover 232 is shaped on the inside such that the stator 210 of the electric motor 4 can be arranged across a gap adjacent to the rotor 211 of the electric motor 4 and the stator 210 is mounted accordingly on the cover 232.

On the outside in the radial direction, the clutch cover 232 is centered in the clutch casing 225 and fixed in the axial direction by a locking ring or by screws. The locking ring or the screws generate the necessary contact pressure for a static sealing in the form of, for example, an O-ring. Here, sealing elements that are vulcanized on the clutch cover and must similarly be biased or must provide a sealing lip that is biased during mounting with a sealing face running in the radial direction are also conceivable.

On the inside in the radial direction, there is, on the clutch cover 232, a radial shaft sealing ring 233 that is either vulcanized on or pressed into the clutch cover 323 like a classic radial shaft sealing ring. The radial shaft sealing ring 233 functions as a dynamic sealing element and represents a transition point from the stationary cover 232 to the input side of the hybrid disconnect clutch rotating at the rotational speed of the engine.

The output-side outer plate carrier 213 of the hybrid disconnect clutch is connected locked in rotation to an input side clutch housing 214 of the bow spring damper 202.

The input side clutch housing 214 of the bow spring damper 202 has a pot-shaped construction, wherein an inner region of the input side clutch housing 214 in the radial direction is constructed as part of the piston-cylinder unit for activating the hybrid disconnect clutch.

The output side 204 of the bow spring damper 202 is connected to an input plate carrier 205 of the sub-clutch K1 arranged on the outside in the radial direction, as well as to a flange 206, wherein the flange 206 is connected to the input plate carrier 207 of the clutch K2 arranged on the inside in the radial direction, and wherein the flange 206 is simultaneously the input flange of the centrifugal force pendulum 203.

The output plate carrier 208 of the outer clutch K1 in the radial direction and the output plate carrier 209 of the clutch K2 arranged on the inside in the radial direction are each connected to one of the transmission input shafts of the double clutch transmission 6, 7.

The flange 206 is also connected to a clutch hub 230 that supplies the piston-cylinder unit of the directly activated wet clutch in the present case with pressurized medium.

A corrugated spring 247 that generates an axial biasing load is arranged between the driven-side plate carrier 208 of the outer clutch K1 in the radial direction and the outer transmission input shaft. The clutch hub 230 of the double clutch—in the present case above a sealing plug 244 with thrust functioning—is supported in the axial direction on the driven-side plate carrier 209 of the inner clutch K2 in the radial direction. The clutch hub 230 and the input side of the double clutch connected rigidly to this hub, as well as the secondary side of the ZMS and the centrifugal force pendulum, are supported on the transmission housing in the axial direction by shim washers 240, 241, wherein one of the washers could be pre-mounted in the transmission housing and another of the washers could be pre-mounted on the pump gearwheel, and wherein at least one washer could be placed between these two washers that could be pre-mounted, in order to set an axial position of the double clutch. The biasing force of the corrugated spring 241 is forwarded in the present case by the pump gearwheel 242 and a shoulder of the clutch hub. The pump gearwheel 242 is here connected rigidly to the clutch hub in the axial direction by a locking ring 243 in connection with the shoulder of the clutch hub.

The driven-side plate carrier 209 of the inner clutch K2 in the radial direction is further supported by an axial bearing on the driven-side plate carrier 208 of the outer clutch K1 in the radial direction that is itself supported, in turn, by an axial bearing on a clutch hub 245 of the hybrid disconnect clutch. The clutch hub 245 of the hybrid disconnect clutch is supported by a thrust washer 246 on the input-side inner plate carrier 216 of the hybrid disconnect clutch.

In the radial direction, the clutch hub 230 of the double clutch 201 is supported by two radial bearings on the outer transmission input shaft.

The cover 232 located between rotor 211, 212 of the electric motor 4 and the output side of the hybrid disconnect clutch separates the wet chamber and compression chamber from each other.

As shown, the output side of the hybrid disconnect clutch is connected locked in rotation and fixed in the axial direction to the input side of the double wet clutch 201. Due to this configuration, a complete module that can be pre-mounted can be formed as a mounting assembly that can also comprise a bow spring damper and a centrifugal force pendulum.

Figure 6:
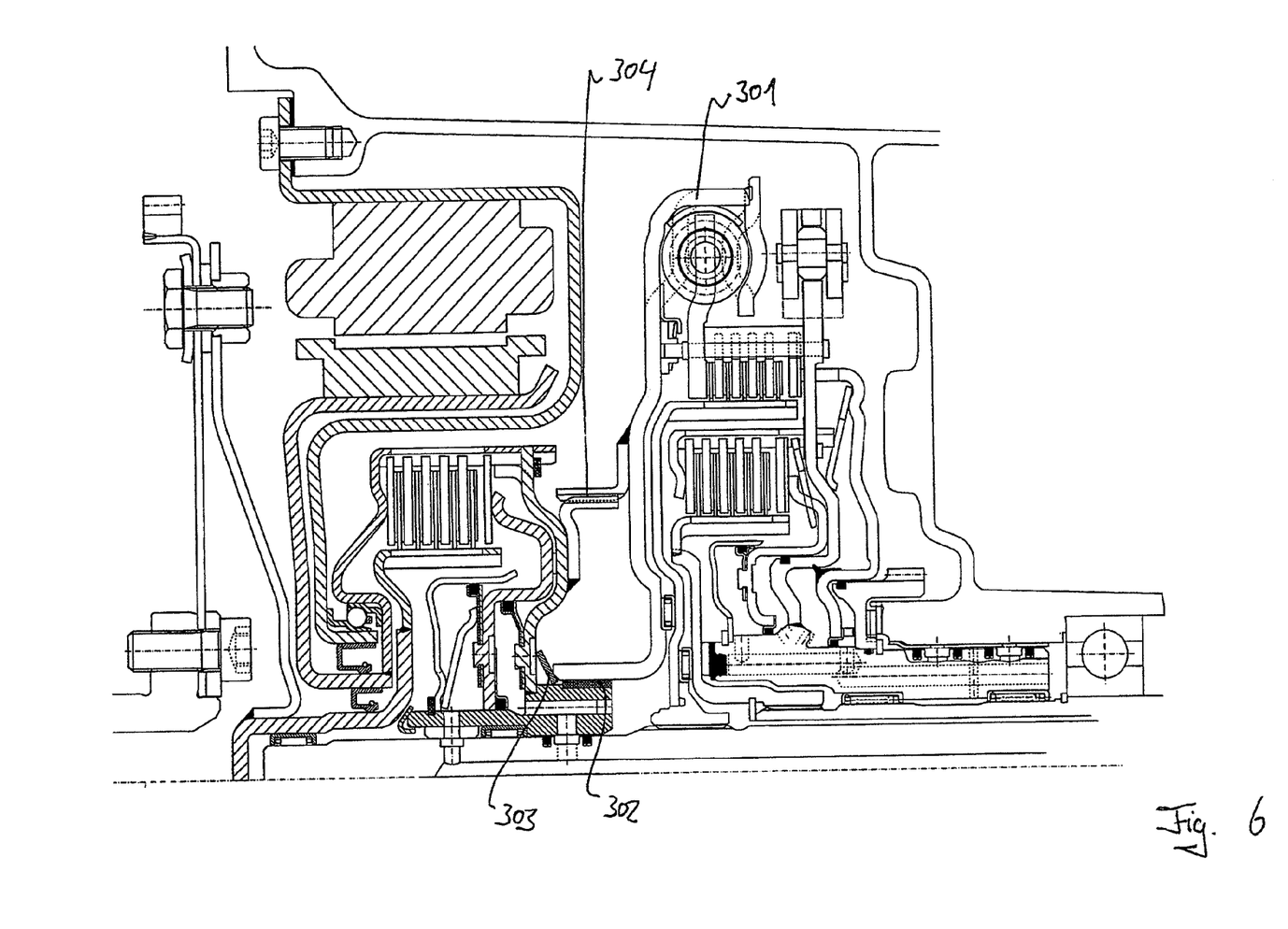
FIG. 6 is a view of another embodiment of a complete module in the sense of FIG. 5 with hybrid module (electric motor and disconnect clutch) and double wet clutch with non-co-rotating wet chamber that are divided into two modules for mounting.

In FIG. 6, another embodiment of the hybrid configuration is shown with disconnect clutch and electric motor including a double wet clutch, wherein the damper and centrifugal force pendulum are integrated in the wet double clutch with non-co-rotating wet chamber, wherein, according to the embodiment from FIG. 6, the entire module is divided into two modules for the mounting. This division is carried out such that the input side clutch housing 214 of the double wet clutch from FIG. 5 is divided into a pot-shaped region 301 that is supported by a sliding bearing 302 on the inside in the radial direction ultimately on one of the transmission input shafts and is biased by this support and a plate spring 303 in the direction of the transmission. For the torque transmission between the hybrid disconnect clutch 2 and double clutch 1, the axial spline teeth 304 are provided, wherein one half of the axial spline teeth 304 are connected to the input side 301 of the double wet clutch and wherein a corresponding side of the spline teeth 304 are connected to the output plate carrier of the hybrid disconnect clutch.

The other features of the embodiment from FIG. 6 correspond to those described in connection with FIG. 5.

Figure 7:
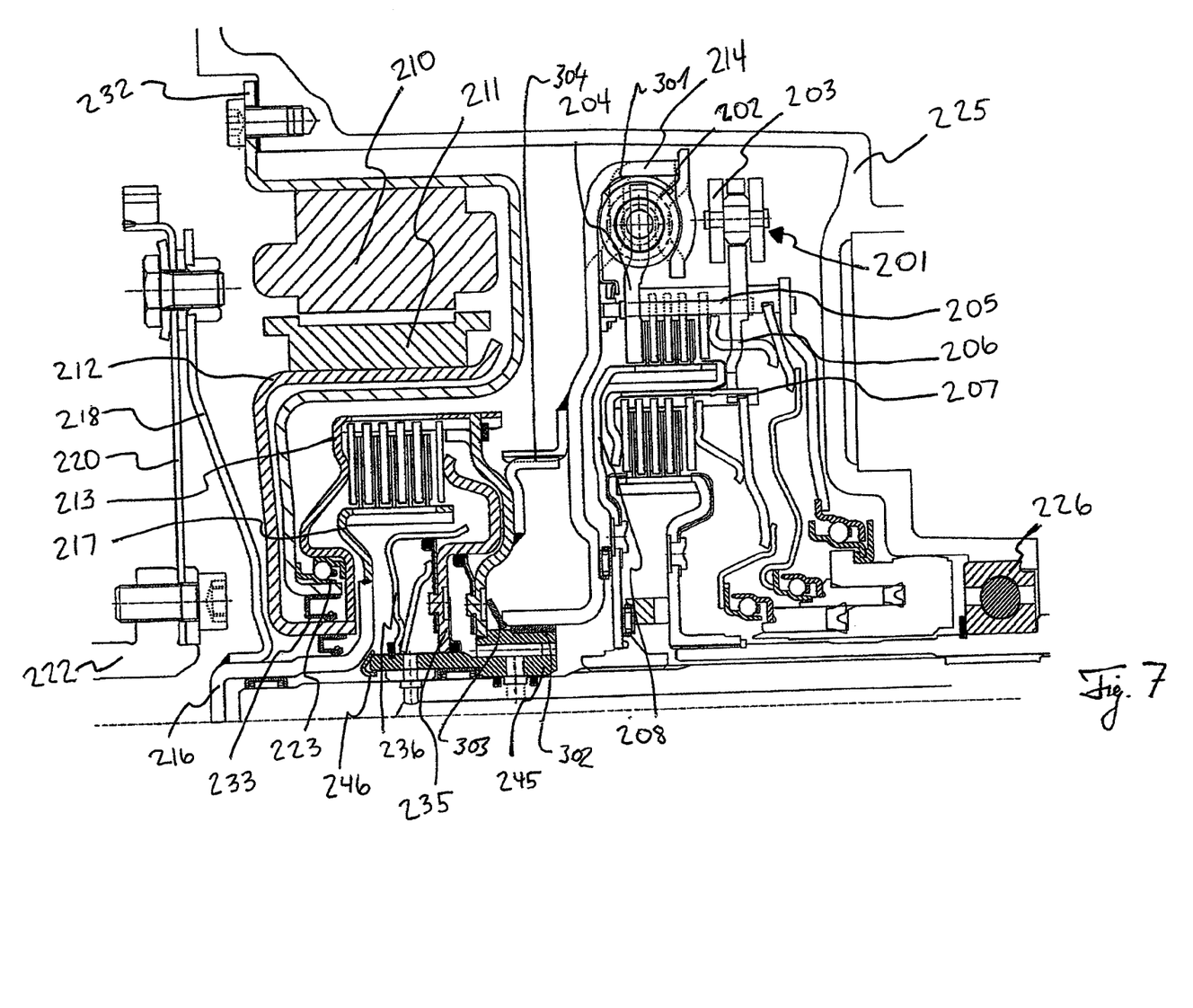
FIG. 7 is a view of another embodiment of a complete module in the sense of FIG. 5 with hybrid module (electric motor and disconnect clutch) and double wet clutch with non-co-rotating wet chamber that are divided into two modules for mounting.

In FIG. 7, another embodiment of the hybrid configuration is shown with disconnect clutch and electric motor including a double wet clutch, wherein the damper and centrifugal force pendulum are integrated again in the wet clutch in connection with the two-part configuration of the overall module as already shown in FIG. 6, wherein the double wet clutch from FIG. 7 can be activated by a lever translation and activation bearings are arranged between the activation elements and the associated piston-cylinder units.

Figure 8:
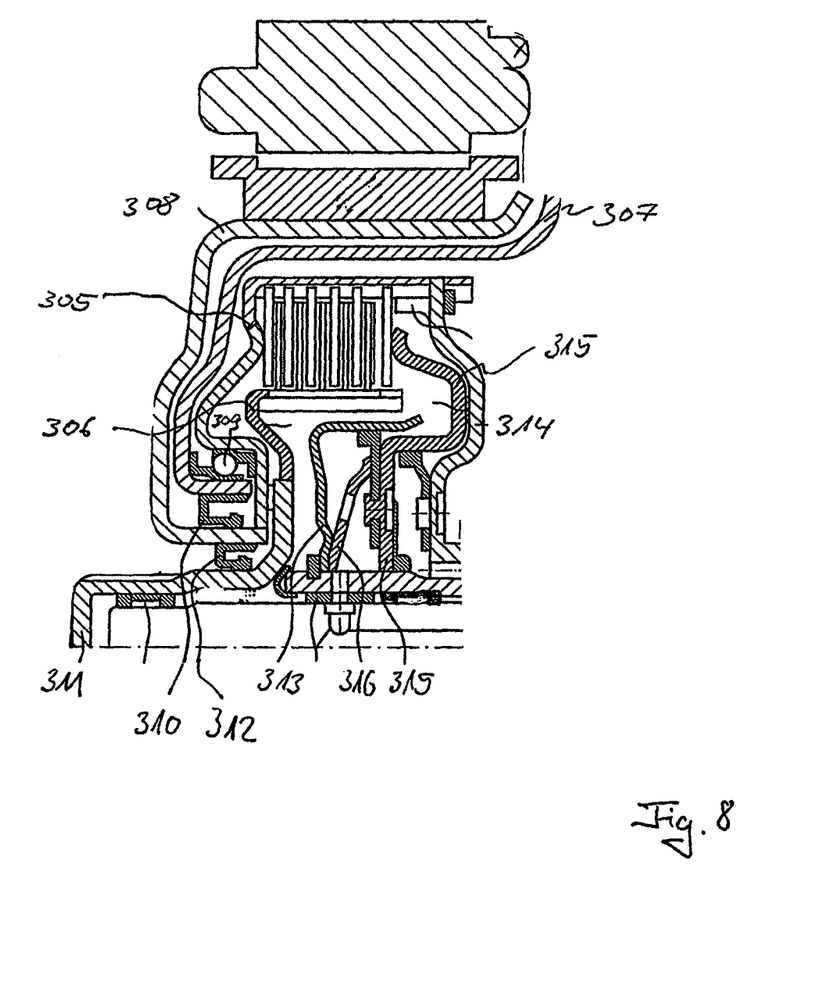
FIG. 8 is a detail view of the disconnect clutch in the embodiment from FIG. 7.

The embodiments of the hybrid disconnect clutch shown in connection with FIGS. 6 and 7 are shown in more detail again in FIG. 8 in a variant with multiple-part output plate carriers 305 and multiple-part input plate carriers 306 and the support of the output plate carrier 305 by the cover 307, as well as the rotationally locked connection between output plate carriers 305 and rotor carrier 308. Here, the bearing 309 is arranged between the cover 307 and outer plate carrier 305. Furthermore, the radial shaft sealing ring 310 is arranged between cover 307 and rotor carrier 308. In addition, the radial shaft sealing ring 312 is arranged between rotor carrier 308 and clutch hub 311 of the hybrid disconnect clutch. For supporting the activation mechanism of the hybrid disconnect clutch, a separate hub is provided that is arranged so that it can rotate on the input shaft formed as a solid shaft of one of the sub-transmissions. On this hub there are pot-shaped plates 313 and 314 that form the cylinder in which the activation element 315 is held so that it can move. The bias loading of the activation element 315 is realized by the plate spring 316. The pot-shaped plate 314 of the activation mechanism is suspended in the output plate carrier 305 comparable to the friction plates.

The embodiments of the hybrid drive train described above have in common that the hybrid disconnect clutch and the double wet clutch are arranged in a joint wet chamber, wherein this wet chamber can selectively have a closed (i.e., co-rotating) or non-co-rotating construction.

Here, the embodiments described above are to be understood merely as examples and each of the selected constructions of the hybrid disconnect clutch, the electric motor, and the double clutch could also be interchanged between the embodiments.

LIST OF REFERENCE SYMBOLS

1 Double wet clutch
2 Disconnect clutch
3 Combustion engine
4 Electric motor
5 Hybrid module
6 Sub-transmission
7 Sub-transmission
8 Differential
9 Driving wheel
10 Stator
11 Rotor
12 Rotor carrier
13 Outer plate carrier
13A Extended region
14 Clutch housing
15 Radial shaft sealing ring
16 Clutch hub
18 Drive plate
19 Screw connection
20 Drive plate
21 Crankshaft
22 Pilot journal
23 Bearing
24 Cover
25 Transmission housing
26 Locking Ring
26' Transmission-side bearing
27 Bearing
28 Input plate carrier
29 Input plate
30 Output plate
31 Output plate carrier
32 Plate spring
33 Cylinder piston unit
34 Hub region
35 Pot-shaped sheet
36 Pot-shaped sheet
102 Axis of rotation
106 Housing part
107 Housing part
108 Housing
111 Energy storage device
112 Torsional vibration damper
113 Input part
113 Flange part
114 Suction pipe
116 Ring flange part
117 Catch
118 Catch
19 Catch
122 Transmission housing
123 Roller bearing
124 Projection
125 Crown gear
128 Wet clutch
129 Wet clutch
130 Bow spring
131 Bow spring
133 Anti-wear lining
134 Plate carrier
135 Plate carrier
136 Bearing disk
137 Clutch hub
138 Plate
139 Plate
140 Friction plates
141 Friction plates
142 Plate carrier
143 Plate carrier
144 Hub
145 Hub
145A Energy storage device
145B Locking washer
146 Teeth
147 Teeth
148 Transmission input shaft 149 Transmission input shaft
150 Torsional vibration absorber
151 Centrifugal force pendulum
152 Flyweight
153 Roller bearing
154 Roller bearing
155 Roller bearing
156 Thrust washer
157 Thrust washer
158 Carrier part
160 Roller bearing
161 Roller bearing
167 Shim washer
169 Piston
170 Piston
175 Supply line
176 Supply line
177 Pressure chamber
178 Pressure chamber
179 Energy storage device
180 Energy storage device
181 Supply line
182 Supply line
183 Guide pin
184 Discharge pipe
185 Friction mechanism
186 Pins
189 Energy storage device
201 Clutch
202 Bow spring damping
203 Centrifugal force pendulum
204 Output side
205 Input plate carrier
206 Flange
207 Input plate carrier
208 Output plate carrier
209 Output plate carrier
210 Stator
211 Rotor
212 Rotor carrier
213 Output plate carrier
216 Clutch hub
218 Drive plate/flexplate
220 Drive plate/flexplate
222 Crankshaft
223 Bearing
232 Cover
233 Radial shaft sealing ring
301 Pot-shaped region
302 Sliding bearing
303 Plate spring
304 Spline teeth
K1 Sub-clutch
K2 Sub-clutch

The invention claimed is:

1. A hybrid module for a drive train of a vehicle, comprising a first disconnect clutch, an electric motor, and a second disconnect clutch, the first disconnect clutch is arranged in a torque flow path between a combustion engine in a drive train and the electric motor, and the second disconnect clutch is arranged in the torque flow path between the electric motor and a gear-shifting transmission in the drive train, wherein the first disconnect clutch and the second disconnect clutch are arranged in a joint wet chamber, wherein the second disconnect clutch is a double clutch with first and second sub-clutches arranged in the torque flow path between the electric motor and the gear-shifting transmission in the drive train, the first and second sub-clutches are connectable to first and second transmission input shafts, respectively, wherein the first disconnect clutch and the double clutch are arranged in the joint wet chamber, wherein an output side of the first disconnect clutch is connected to a rotor of the electric motor and the rotor of the electric motor is connected to an input side of the second disconnect clutch, the joint wet chamber is defined by a clutch housing of the second disconnect clutch, a rotor carrier of the electric motor, and an output plate carrier of the first disconnect clutch, and the output plate carrier of the first disconnect clutch and the rotor carrier of the electric motor is supported by a joint, motor-side bearing on a cover that is supported on a transmission housing, and the transmission housing is supported by a transmission-side bearing on a transmission side.

2. The hybrid module according to claim 1, wherein the joint wet chamber of the clutches is closed by a cover that is arranged between a rotor of the electric motor and an output plate carrier of the first disconnect clutch and is supported on a transmission housing.

3. The hybrid module according to claim 2, wherein the rotor of the electric motor is connected to an output side of the first disconnect clutch and the output side of the first disconnect clutch is connected to an input side of the second disconnect clutch.

4. The hybrid module according to claim 2, wherein a stator of the electric motor is mounted on the cover.

5. The hybrid module according to claim 2, wherein an assembly module is formed from the first disconnect clutch, the electric motor, and the second disconnect clutch, wherein the assembly module is connectable to the transmission before the transmission is connected in the drive train to the combustion engine.

6. The hybrid module according to claim 1, wherein the rotor carrier of the electric motor is connected rigidly to the clutch housing of the second disconnect clutch and the output plate carrier of the first disconnect clutch.

7. The hybrid module according to claim 1, wherein at least one of a bow spring damper is arranged in the joint wet chamber or a centrifugal force pendulum is arranged in the joint wet chamber for vibration isolation in the drive train between the combustion engine and the transmission.

8. The hybrid module according to claim 1, wherein an activation system for the double clutch is provided including a piston/cylinder unit and a force-transfer element for each of the sub-clutches of the double clutch with force transmission with or without a lever effect between piston/cylinder units and friction plates of the sub-clutches.

9. A hybrid module for a drive train of a vehicle, comprising a first disconnect clutch, an electric motor, and a second disconnect clutch, the first disconnect clutch is arranged in a torque flow path between a combustion engine in a drive train and the electric motor, and the second disconnect clutch is arranged in the torque flow path between the electric motor and a gear-shifting transmission in the drive train, wherein the first disconnect clutch and the second disconnect clutch are arranged in a joint wet chamber, wherein the second disconnect clutch is a double clutch with first and second sub-clutches arranged in the torque flow path between the electric motor and the gear-shifting transmission in the drive train, the first and second sub-clutches are connectable to first and second transmission input shafts, respectively, wherein the first disconnect clutch and the double clutch are arranged in the joint wet chamber, wherein an output side of the first disconnect clutch is connected to a rotor of the electric motor and the rotor of the electric motor is connected to an input side of the second disconnect clutch, the joint wet chamber is defined by a clutch housing of the second disconnect clutch, a rotor carrier of the electric motor, and an output plate carrier of the first disconnect clutch, the rotor carrier of the electric motor is connected rigidly to the clutch housing of the second disconnect clutch and the output plate carrier of the first disconnect clutch, wherein a static sealing element is arranged at least one of between the rotor carrier of the electric motor and the clutch housing of the second disconnect clutch or between the rotor carrier and the output plate carrier of the first disconnect clutch.

10. A hybrid module for a drive train of a vehicle, comprising a first disconnect clutch, an electric motor, and a second disconnect clutch, the first disconnect clutch is arranged in a torque flow path between a combustion engine in a drive train and the electric motor, and the second disconnect clutch is arranged in the torque flow path between the electric motor and a gear-shifting transmission in the drive train, wherein the first disconnect clutch and the second disconnect clutch are arranged in a joint wet chamber, wherein the second disconnect clutch is a double clutch with first and second sub-clutches arranged in the torque flow path between the electric motor and the gear-shifting transmission in the drive train, the first and second sub-clutches are connectable to first and second transmission input shafts, respectively, wherein the first disconnect clutch and the double clutch are arranged in the joint wet chamber, wherein an output side of the first disconnect clutch is connected to a rotor of the electric motor and the rotor of the electric motor is connected to an input side of the second disconnect clutch, wherein the joint wet chamber is defined by a clutch housing of the second disconnect clutch, a rotor carrier of the electric motor, and an output plate carrier of the first disconnect clutch, wherein a radial shaft sealing ring is arranged between a clutch hub of the first disconnect clutch and the output plate carrier of the first disconnect clutch and seals the joint wet chamber.

* * * * *